June 8, 1965   G. S. SPENCER   3,187,869
CENTRIFUGALLY RELEASED ONE-WAY CLUTCH
Filed April 6, 1961

INVENTOR.
Glenn S. Spencer
BY
John Phillips Ryan
ATTORNEY

United States Patent Office 3,187,869
Patented June 8, 1965

3,187,869
CENTRIFUGALLY RELEASED ONE-WAY CLUTCH
Glenn S. Spencer, Horseheads, N.Y., assignor to The Bendix Corporation, Elmira Heights, N.Y., a corporation of Delaware
Filed Apr. 6, 1961, Ser. No. 101,185
3 Claims. (Cl. 192—104)

The present invention relates to a one-way clutch and more particularly relates to a clutch which incorporates a roller cage member which is centrifugally actuated so as to be rotatably shifted relative to one of the clutch members whereby the driving rollers are caused to be urged out of their wedging position thereby disestablishing the driving relation between the clutch members with the disestablishment being determined solely as a function of the overrunning clutch member.

It is an object of the present invention to provide a one-way clutch connection between axially aligned driving and driven shafts which is facile, economical to manufacture and fabricate and efficient and dependable in operation.

It is another object of the present invention to provide an overrunning roller clutch in which the driving relation established between the driving and driven clutch members by wedged rollers can be disestablished at a predetermined overrunning speed by a centrifugally actuated roller cage member.

It is another object of the present invention to provide a one-way clutch in which the driving relation between the clutch members can be completely disestablished in a quiet manner and when so disestablished any cooperation or contact between the rollers and driving clutch member is completely eliminated so long as the driven clutch member is propelled at or above a predetermined speed thus eliminating unnecessary clutch wear and noise during overrun conditions.

It is still another object of the present invention to provide a roller type overrunning clutch having an annular slotted roller retainer cage interposed between the driving and driven clutch members for shifting the rollers out of a wedging position, said cage carrying means responsive to centrifugal force adapted to provide the shifting action of the cage.

Further objects and advantages will be apparent from the following description taken in connection with the accompanying drawing which illustrates a single embodiment of the invention constructed according to the best mode so far devised for the practical application of the principles thereof, and in which.

Figure 1:
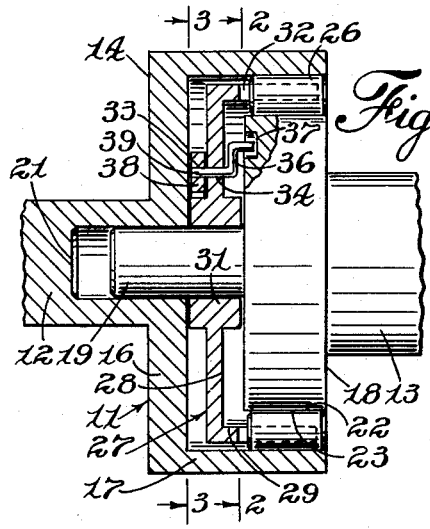
FIGURE 1 is a longitudinal sectional view, partly in section and broken away, illustrating a one-way roller clutch embodying the invention.
Figure 2:
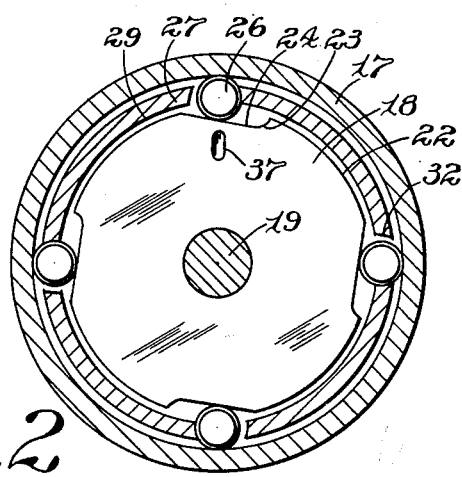
FIGURE 2 is a detail sectional view taken substantially on the plane of section line 2—2 of FIGURE 1.

Referring now to the drawing wherein like reference characters designate like or corresponding parts throughout the several views, FIGURE 1 illustrates a one-way roller clutch generally designated as 11. The clutch is used in conjunction with a driving shaft 12 and a co-axially aligned driven shaft 13. The driving shaft supports the outer or driving clutch member 14 which, in the present invention, comprises a radial flange 16 secured by any conventional means to the shaft 12 and an annular member 17 carried by the flange. The driven shaft supports the inner or driven clutch member 18 which is a flange-like member concentrically supported within the annulus of the driving clutch member 14. A reduced diameter portion 19 of the driven shaft 13 is rotatably supported in a cavity 21 of the driving shaft 12.

The outer peripheral surface 22 of the inner clutch member is formed with a plurality of roller receiving recesses 23 facing or opening towards the inner periphery of the driving clutch annulus 17. Each recess is at one end angularly tapered toward the periphery as at 24 to provide a cam surface. A plurality of rollers 26 of a predetermined diameter are positioned one in each of the recesses 23. The rollers, when wedged between the cam surface and the inner peripheral surface of the annular member of the driving clutch member, establish a driving relation between the clutch members 14 and 18.

Figure 5:
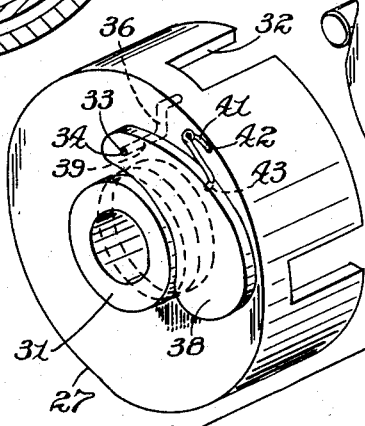
FIGURE 5 is an exploded perspective detail view illustrating the roller cage member, actuating means supported on the cage which are capable of being influenced by centrifugal force adapted to rotate the cage member, the rollers and the inner clutch member.

A roller cage generally designated as 27, best illustrated in FIGURE 5, is journalled on the reduced diameter portion 19 of the driven shaft intermediate the driving clutch flange 16 and the inner clutch 18. The roller cage is a cup-shaped member having a bottom wall 28 and an integrally formed cylindrical side wall 29. Bearing means 31 are formed centrally of the bottom wall to rotatably support the cage on the shaft portion 19. The side wall of the cage is provided with a plurality of longitudinally extending slots 32, one of which is positioned substantially radially opposite each of the recesses 23 to embrace the roller positioned therein. The rollers fit loosely within the slots 32 but are limited in moving into and out of the wedging position by the cage slots.

Figure 3:
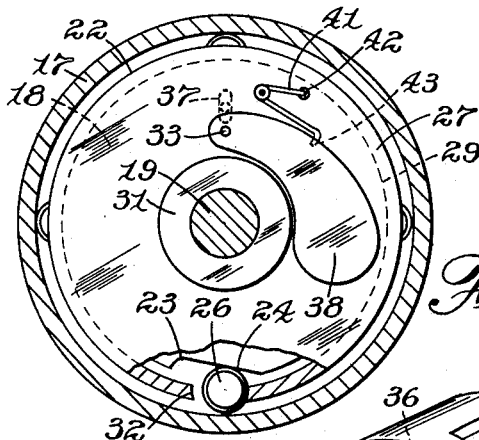
FIGURE 3 is a detail sectional view taken substantially on the plane of section line 3—3 of FIGURE 1.
Figure 4:
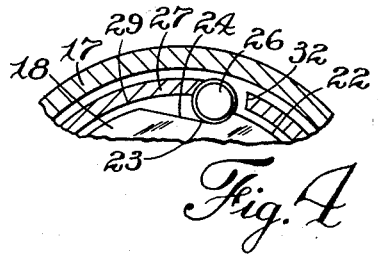
FIGURE 4 is a fragmentary detail view illustrating a roller urged to its retracted position by the roller cage member.

Means are provided for establishing a driving connection between the inner clutch member and the roller cage and for rotating the cage a limited amount relative to the inner clutch to cause the rollers to be urged to a wedging position. These means comprise a lever member 33 journalled intermediate its extremities in an appropriately positioned aperture 34 provided in the cage wall 28. The extremity of the lever projecting into the cavity defined by the cage is axially offset in a step shape as is illustrated at 36 with the extremity which is parallel to the axis of the aligned shafts engaging an elongated radial void 37 formed in the radial face of the inner clutch member. The engagement between the lever extremity 36 and the void 37 provides a pivotal connection hereinafter more completely described. A weight member or flyball 38 is fixedly secured to the straight extremity 39 of the lever. The weight member is adapted to be actuated by centrifugal force when the cage is driven at and above a predetermined speed. Normally during idle or below the predetermined speed the weight member will assume the position illustrated in FIGURE 3 causing the lever to be rotated in a clockwise direction when viewing FIGURE 1 from the left-hand side. Rotation of the lever 33 will attempt to cause clockwise rotation of the offset lever extremity 36 but because of the inertia of the inner clutch and the pivotal connection between the extremity 36 and void 37, this rotation will be limited and will be effectively translated into a rotational force of sufficient magnitude to turn the cage in a counterclockwise direction. The rollers 26 embraced by the cage slots 32 will then be displaced in a counterclockwise direction within the recesses 23, which displacement will cause a wedging action to occur between the rollers, the recess cam surfaces 24 and the inner peripheral surface of the annulus 17 of the outer clutch member. Driving relation between the outer and inner clutch members is thus effectively established. While a single weight member-cage actuating means is illustrated and described, it can be appreciated that paired actuating means might be used to offset the effect of gravity which might influence the weight means.

Engagement between the lever and the inner clutch member also provides a driving couple between these members and, consequently, when the inner clutch is driven, the cage will also be rotated at the same rate of speed. The pivotal connection of the offset lever extremity does, however, provide for a limited rotational movement as previously described.

The propelling means for the driving clutch member should have a free running speed which is equal to or slightly less than the predetermined speed which has been determined sufficient to cause centrifugal actuation of the weight member. This limitation is necessary in order to effectively prevent the possibility of disestablishing the driving relation between clutch members due to the high speed of the driving clutch means propelling means, and further, it ensures that the disestablishment is always controlled by the driven clutch member and the propelling means which causes it to overrun.

When the cage is rotated by the inner clutch at and above a predetermined speed, the weight member will be actuated by centrifugal force and will tend to be thrown radially outwardly. This movement of the weight member will rotate the lever in a counterclockwise direction and, due to the pivotal connection between the lever offset extremity and the inner clutch, will be translated into rotation of the cage in a clockwise direction. As a consequence of the cage movement, the rollers will be urged into the deepest portion of the recesses out of their wedging position thereby disestablishing the driving relation between the clutch members 14 and 18.

To assure proper return of the weight member to the position establishing a driving relation, a hairpin spring 41 is provided which asserts a biasing force on the weight member opposing its movement due to centrifugal force. The spring has one extremity anchored in the cage wall 28 at 42 and its other extremity engages a recess 43 in the weight member. The compression of the spring 41 will limit the extent of radial movement of the weight member. If desired, a pin member (not shown) can be positioned in the cage wall 28 to limit the extent of radial movement of the weight member. In any event, the weight member's radial movement will definitely be limited when it strikes the inner peripheral surface of the annulus 17.

Figure 6:
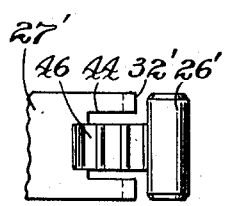
FIGURE 6 is a plan view of a modification of the invention.
Figure 7:
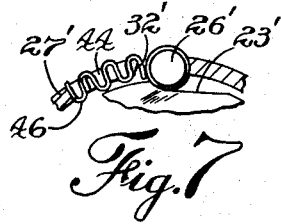
FIGURE 7 is a side elevational view of the modification illustrated in FIGURE 6.

The preferred embodiment may be modified as illustrated in FIGURES 6 and 7 to gain more uniform wedging action. This object can be attained by forming a circumferential void 44 in the retainer cage 27 extending from the slots 32' positioned adjacent each of the recesses 23'. The void thus creates a circumferential opening into which a serpentine spring 46 fits, one end of the spring seated in the base of the void and the other end thereof exerting a force on the rollers 26' tending to move the rollers in a wedging direction. The spring 46 is weaker than the weight member hairpin spring 41 thus voiding the possibility that the retainer cage would be biased rather than the rollers. The serpentine spring allows for greater manufacturing tolerances since it will, to a high degree, compensate for variations in dimensions between the rollers, cam surfaces and retainer cage slots.

It will be understood that the invention is not limited in its applications to the details of construction and arrangements of parts illustrated and described in the accompanying drawings and the above description, since the invention is capable of other improvements and of being practiced and carried out in various ways. Also, it is to be understood that the phraseology or terminology employed herein is for the purpose of description and it is not intended to limit the invention herein claimed beyond the requirements of the prior art.

I claim:
1. A one-way clutch for connecting a driving shaft and a coaxially aligned driven shaft comprising: an outer clutch member adapted to be connected to one of said shafts and an inner clutch member adapted to be connected to the other of said shafts, said clutch members being concentrically mounted; means which connect said clutch members in driving relation to each other including a plurality of roller receiving recesses formed on the inner clutch member facing the outer clutch member each of said recesses having a cam surface between which and the inner periphery of the outer clutch member a roller of a predetermined diameter is adapted to be wedged when driving relation is established between said clutch members; a plurality of rollers, one of which is positioned in each of said recesses; a roller cage journalled on a shaft extension intermediate said driving and driven shafts having annular portions concentrically interposed between said clutch members including a plurality of slots, one of which is positioned in substantially radial alignment with each of said recesses to embrace portions of the rollers in said recesses; a lever, including a straight extremity and an offset extremity, journalled intermediate said extremities in the roller cage and having said extremities in parallel axial alignment with said shafts, said offset extremity being pivotally supported in the inner clutch member providing a driving connection between the cage and the inner clutch member; and, weight means fixedly secured to the lever straight extremity adapted to be actuated by centrifugal force for rotating said lever whereby the roller cage is rotatably displaced a limited amount relative to the inner clutch member and urges the rollers out of their wedging position to thereby disestablish the driving relation between said clutch members.

2. The one-way clutch set forth in claim 1 including further spring means cooperating with the roller cage and the weight means for normally urging the cage and rollers to a position establishing the driving relation between the inner and outer clutch members.

3. A one-way clutch for connecting a driving shaft and a coaxially aligned driven shaft comprising: an outer clutch member adapted to be connected to the driving shaft and an inner clutch member adapted to be connected to the driven shaft, said clutch members being concentrically mounted; means for connecting said clutch members in driving relation to each other including a plurality of roller receiving recesses formed on the inner clutch member opening towards the inner periphery of the outer clutch member, each of said recesses having a cam surface between which and the inner periphery of the outer clutch member a roller of a predetermined diameter is adapted to be wedged when the driving relation is established between the inner and outer members; a plurality of rollers, one of which is positioned in each of said recesses; a cup-shaped roller cage including a bottom wall and a cylindrical side wall having a centrally positioned bearing therein adapted to be journalled on the driven shaft, said side wall providing an annular member concentrically positioned between the inner and outer clutch member and including a plurality of longitudinal slots, one of which is positioned in substantially radial alignment with each of said recesses to embrace portions of the rollers positioned therein; a lever, including a straight extremity and a parallel axially offset extremity, journalled intermediate said extremities in the cage bottom wall with the lever extremities' axes in parallel alignment with the driving and driven shafts, said offset extremity being pivotally supported in the inner clutch member adapted to provide a driving connection between the inner clutch member and the roller cage; a weight member fixedly secured to the lever straight extremity adapted to be actuated by centrifugal force for rotating said lever whereby the cage is caused to rotate a limited amount relative to the inner clutch member to thereby disestablish the driving relation between the clutch members; and, spring means coacting with the lever member and cage bottom wall adapted to urge the cage into engagement with the rollers and bias said rollers toward a wedged position to thereby establish a driving relation between the inner and outer clutch members.

References Cited by the Examiner

UNITED STATES PATENTS

| | | |
|---|---|---|
| 1,797,820 | 3/31 | Brump. |
| 1,841,392 | 1/32 | Atkinson et al. _____ 192—27 |
| 1,937,211 | 11/33 | Vondra _____ 192—45 |
| 2,140,737 | 12/38 | Dickens _____ 192—27 |
| 2,173,604 | 9/39 | Dodge _____ 192—45.1 |
| 2,433,553 | 12/47 | Heintze. |
| 2,815,838 | 12/57 | Dodge _____ 192—45 |
| 2,843,238 | 7/58 | Rozner _____ 192—45 |
| 2,923,388 | 2/60 | Nielsen. |
| 3,054,488 | 9/62 | General et al. _____ 192—44 |

DAVID J. WILLIAMOWSKY, *Primary Examiner.*

THOMAS J. HICKEY, *Examiner.*